Figure 1:
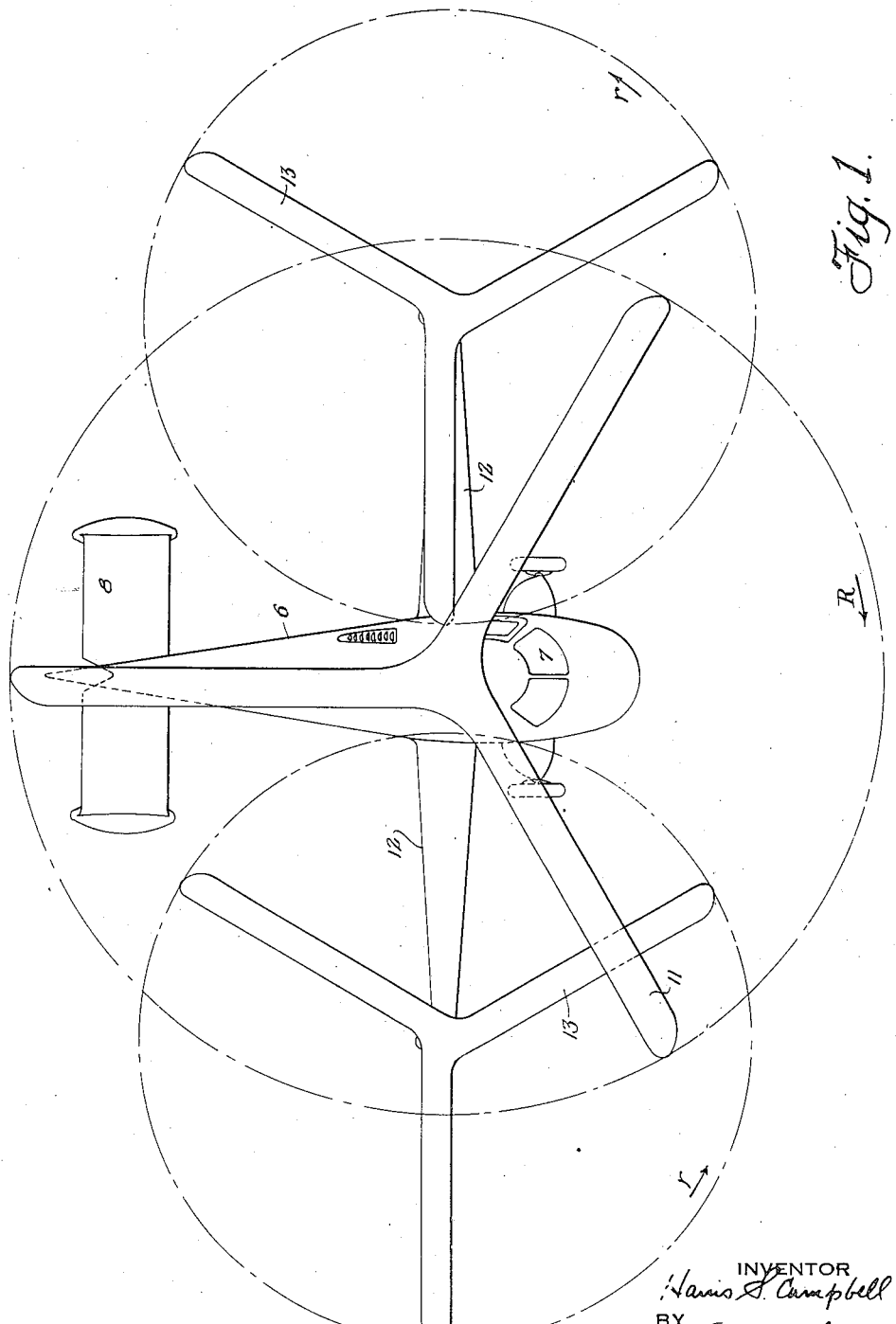

Sept. 28, 1943.  H. S. CAMPBELL  2,330,204
MULTIROTOR AIRCRAFT
Filed Sept. 15, 1941  3 Sheets-Sheet 1

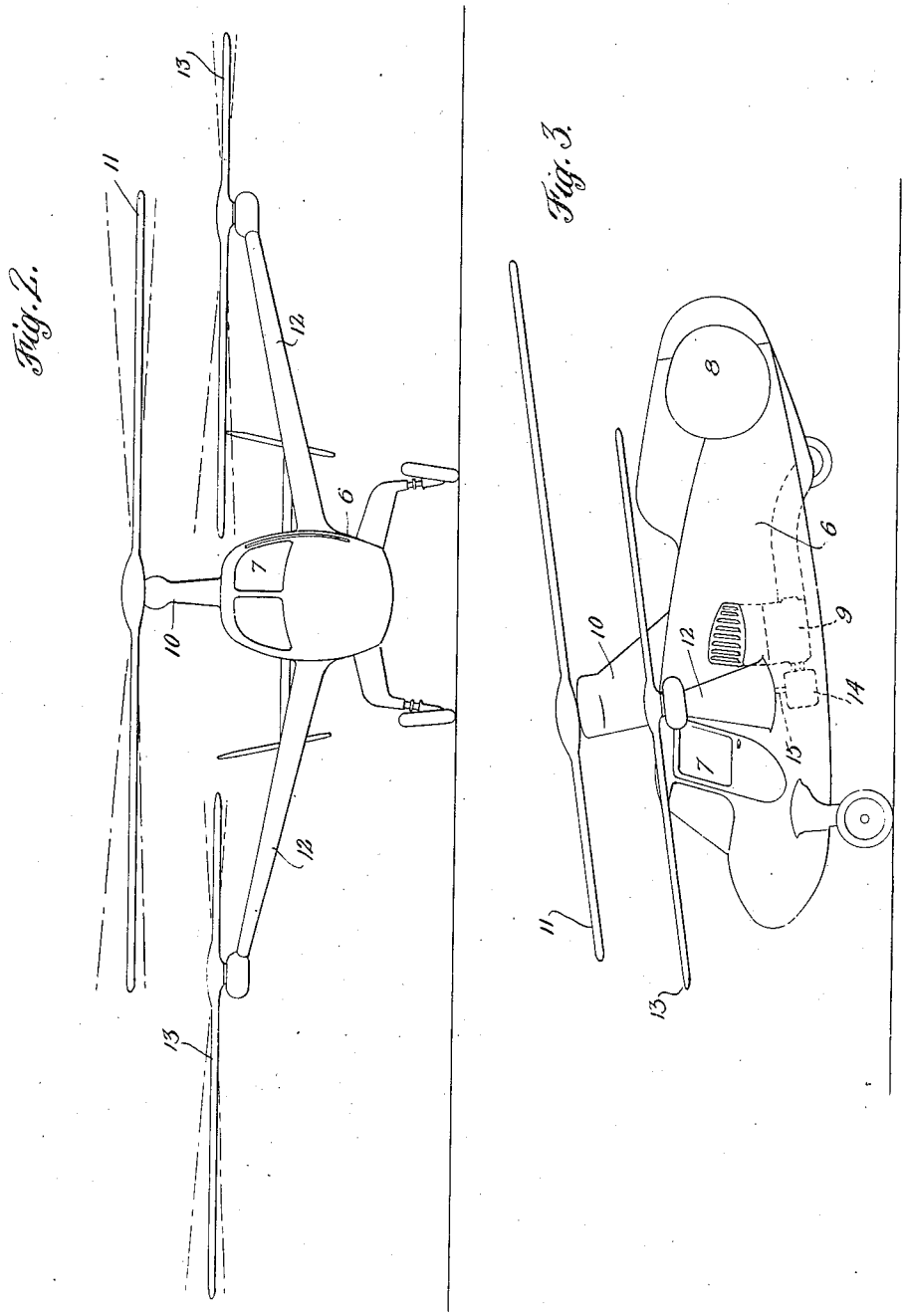

Sept. 28, 1943.  H. S. CAMPBELL  2,330,204
MULTIROTOR AIRCRAFT
Filed Sept. 15, 1941  3 Sheets-Sheet 3
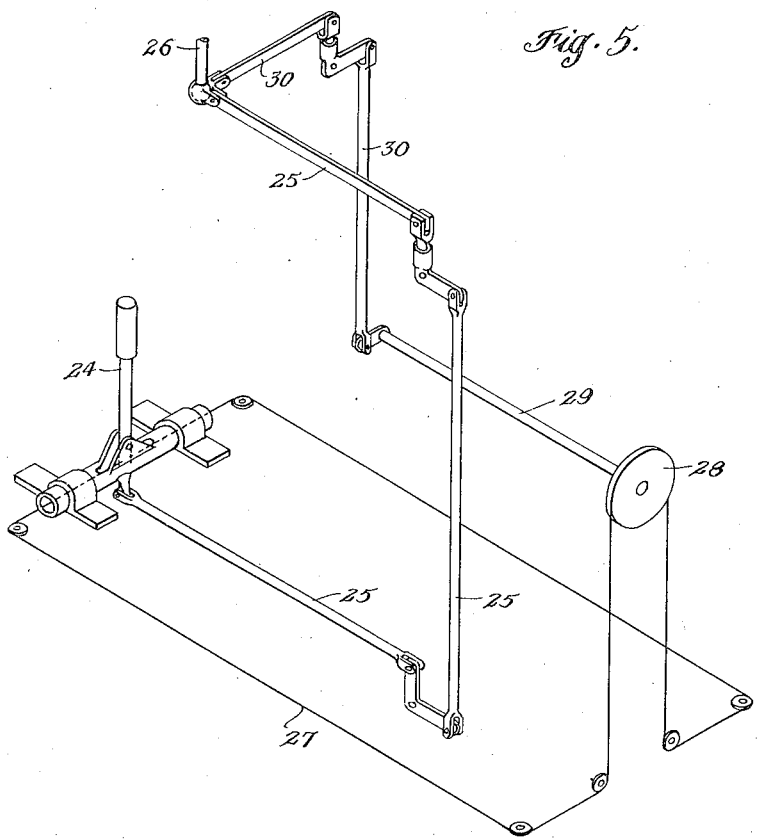
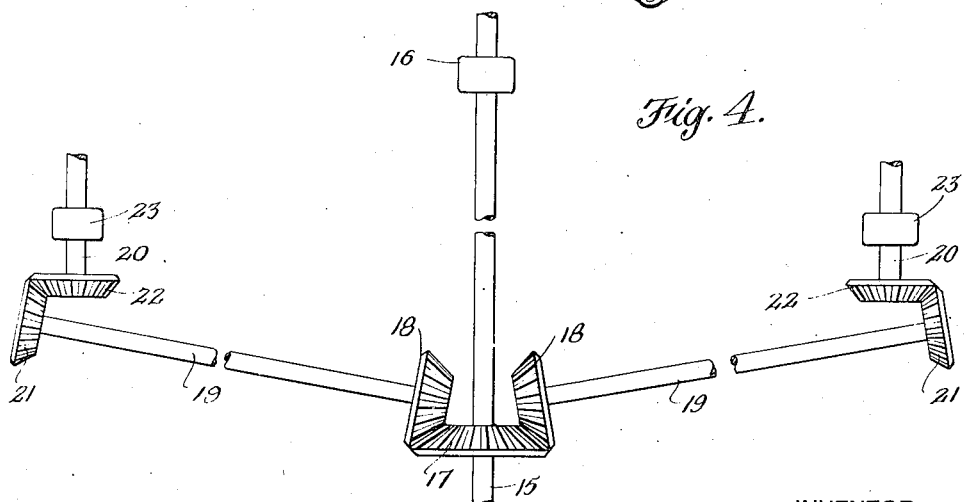
INVENTOR
Harris S. Campbell
BY
ATTORNEYS Patented Sept. 28, 1943

2,330,204

UNITED STATES PATENT OFFICE 2,330,204

MULTIROTOR AIRCRAFT

Harris S. Campbell, Bryn Athyn, Pa., assignor to Autogiro Company of America, Philadelphia, Pa., a corporation of Delaware Application September 15, 1941, Serial No. 410,829

15 Claims. (Cl. 244—17)

This invention relates to multi-rotor aircraft and is particularly concerned with an aircraft equipped with a plurality of rotors adapted to be power driven, at least under certain flight conditions.

One of the principal objects of the invention is to counteract rotor driving torque in a novel and advantageous manner in a multi-rotor helicopter or the like.

A further object is to so arrange the rotors as to effect a considerable reduction in the overall transverse or span dimension of the aircraft, and for this purpose the rotors according to the present invention, though partially overlapping each other along the transverse axis of the machine, are as an entirety in a symmetrical arrangement with respect to the body.

Still further, the invention has in view disposition of overlapping rotors in such a way that incorporation of flappingly-pivoted blades in the rotors, as is preferred, will not necessitate excessive vertical spacing of one rotor from another.

In general, the foregoing objects are secured by the employment of three rotors in a special arrangement fully described hereinafter, which is in contrast with prior multi-rotor helicopter proposals which most frequently contemplate rotors in multiples of two.

The preferred embodiment of the three rotor aircraft herein contemplated is illustrated in the accompanying drawings, in which—

Figure 1 is a top plan view of the craft;
Figure 2 is a view in front elevation;
Figure 3 is a view in side elevation;
Figure 4 is a somewhat diagrammatic layout of portions of the rotor drive mechanism; and
Figure 5 is a schematic illustrating a rotor control system which may be employed.

Although certain features of the invention are applicable to a variety of types of rotative winged aircraft, the drawings illustrate a helicopter having a fuselage 6 with an occupant's cabin 7 toward its forward end and, at the rear, an appropriate empennage 8, which desirably incorporates vertical and horizontal stabilizing surfaces as well as a controllable rudder and, if desired, a controllable horizontal surface. Although the engine means may comprise a plurality of engines, and even a separate engine for each rotor, in the arrangement illustrated a single engine 9 is used and is located to the rear of the occupant's cabin. A power plant common to all of the rotors has the advantage of providing for torque "on" or torque "off" for all rotors.

As clearly appears in Figures 1, 2 and 3, the rotors include a relatively large central rotor mounted on pylon 10, this rotor including a plurality of blades or airfoils 11 pivotally connected to a common hub (not shown) in a manner well understood in this art, the pivot or pivots of each blade providing freedom for swinging movement of the blades in the flapping sense whereby to automatically compensate differential lift effects and to automatically relieve gyroscopic precessional effects during translational flight. Translational flight may be effected by tilting the machine forwardly so as to secure a horizontal component of thrust from the power driven rotors (see Figure 3). Supplementarily or alternatively a propulsive airscrew may be employed.

At each side of the fuselage 6 an outrigger 12 serves to support a relatively small diameter rotor incorporating flappingly-pivoted blades 13.

As shown in Figure 1, the blades 11 of the large rotor are oriented so as to rotate in one direction (see arrow R), whereas the blades 13 of each of the smaller rotors are oriented to rotate in the opposite direction (see arrows r). Drive of the rotors in the directions just mentioned may be effected through power transmission means shown in Figures 3 and 4. As appears in Figure 3, power is delivered from the engine 9 to the gear and clutch unit 14, it being understood that this unit incorporates a manually controllable clutch for connecting and disconnecting the delivery shaft 15 with respect to the engine 9, and preferably also a reduction gear. Shaft 15 extends upwardly generally axially of the large rotor and, as seen in Figure 4, this shaft (15) incorporates an overrunning clutch 16 for the large rotor. Shaft 15 (beyond the overrunning clutch) may be directly coupled to the large rotor or connected therewith through appropriate gearing although, in the transmission as herein disclosed, it is contemplated that there should be a 1 to 1 ratio between shaft 15 and the larger rotor.

Shaft 15 also drives bevel gear 17 with which pinions 18 are adapted to mesh, each such pinion being connected with a transversely extending shaft 19 which may suitably be carried through one of the outriggers 12, to be geared to rotor driving shaft 20 (gearing 21—22). Each shaft 20 incorporates an overrunning clutch 23 providing for free overrunning of the small rotor at that side.

Inspection of Figure 4 will show that direct coupling of shaft 15 with the large central rotor and gearing of the two small rotors in the manner illustrated, provides rotation of the large rotor in one direction and rotation of the two small rotors in the opposite direction. It should further be noted that a step-up is effected to each of the small rotors through gearing 17—18, this step-up preferably bearing, approximately, the relationship hereinafter defined with respect to the ratio between the diameters and blade chord dimensions of the large and small rotors. I prefer an arrangement (as shown) in which each small rotor has a diameter about three-quarters of the large rotor (with about the same ratio between the large and small rotor blade chord dimensions). For substantial equalization of rotor driving torques with rotors of that ratio, the gearing ratio at 17—18 (or at any other suitable point in the transmission) should be approximately 2 to 3.

As hereinbefore indicated, the empennage may incorporate a controllable rudder which may be used for control of the aircraft in yaw. For control in pitch and roll, provision may be made for differentially or similarly tilting the lift lines of the two smaller rotors (either by actually tilting the rotor hubs, or by imposing periodic differential pitch change on the blades of the small rotors) as disclosed, for example, in my copending application Serial No. 324,387, filed March 16, 1940, which issued on June 15, 1943, as Patent 2,321,572. However, from the standpoint of simplicity in the control system, I prefer to assign the functions of control in pitch and roll to the single large rotor, for which purpose an arrangement such as diagrammed in Figure 5 may be used. As there shown, a control stick 24, movable in both fore and aft and transverse planes, is connected through linkage 25 with a control member 26, said linkage providing for fore and aft movement of member 26 with fore and aft movement of the control stick. Transverse movement of member 26 is effected by transverse movement of the control stick through a closed circuit cable 27 associated with pulley 28 on torque shaft 29. Linkage 30 connects the torque shaft with member 26. Although member 26 may be connected with the rotor hub in a manner to provide for tilting movement of the hub itself in fore and aft and transverse planes, said member is herein assumed to be associated with a differential pitch control mechanism for the blades of the large rotor, one example of which is disclosed in copending application of Harold F. Pitcairn, Serial No. 363,997, filed November 2, 1940, and another example of which appears in my Patent 2,153,610.

With respect to the control system, whether tilting of the rotor hub or differential pitch change be employed, the result is a shifting of the thrust line with respect to the center of gravity of the aircraft, thereby introducing the desired control moments (in pitch or roll).

With the general arrangement of the fuselage, cabin, engine, and rotors, as illustrated in the drawings, the center of gravity of the aircraft as a whole will lie a little ahead of the engine 9. Although the large rotor may be positioned with its axis ahead of the center of gravity and the small rotors with their axes to the rear of the center of gravity (or vice versa), as shown herein the axes of all three rotors are located substantially in a common generally upright transverse plane containing the center of gravity. Thus the invention contemplates a substantially symmetrical arrangement of the axes of the three rotors with reference to said transverse generally upright plane containing the center of gravity of the aircraft.

Moreover, the disposition of the rotors, as will be seen from the drawings, is such that the disc areas swept by the blades of each rotor overlap to a considerable extent, each of the smaller rotors being mounted on an outrigger to rotate in a plane below the large rotor and nested as close as practicable to the fuselage.

Because of the foregoing, the overall transverse span of the rotors is considerably reduced as compared with that in a machine of the prior type in which the entire load is carried by two side-by-side rotors. Still further, since the rotors 13 of my improved arrangement are relatively small, the outriggers are also relatively short and may be made of lighter construction, as compared with a machine having only two side-by-side rotors. It should further be noted that with small rotors of diameter approximately three-quarters that of the large rotor, the load carried by each of the small rotors is equal to only slightly more than one-quarter of the total load, thereby making possible a further lightening of the outrigger construction.

The vertical clearance required between the flappingly-pivoted blades of the several rotors is also considerably reduced as compared with the prior type of helicopter in which the entire load is carried by two oppositely rotating rotors superimposed on a common axis. The reason for this will be apparent from inspection of Figures 1 and 2, on the latter of which dotted lines have been applied to indicate ranges of flapping movements for the blades of the three rotors. If it be kept in mind that during normal translational flight each blade of a flappingly-pivoted rotor reaches its point of highest flapping when the blade has passed a little beyond the forwardmost position, and its point of lowest flapping substantially diametrically opposite, it will be seen that at no point in the circle of rotation of the three rotors, as shown in Figure 1, does the region of lowest flapping of the blades of the larger rotor overlie the region of highest flapping of the blades of either of the smaller rotors. In fact, careful analysis will show that the flapping cycles of the large and small rotors would normally tend automatically to maintain considerable spacing between the tips of the large rotor blades and the tips of the small rotor blades at all points where the tip-paths cross.

I claim:

1. An aircraft of the sustaining rotor type including power means and three rotors adapted to be driven from said power means, one of said rotors being of relatively large diameter, with its axis disposed generally in the longitudinal plane of symmetry of the craft, and the other two of said rotors being of relatively small diameter and constituting a pair arranged generally symmetrically with respect to the longitudinal plane of symmetry, one offset to one side of said plane and the other offset to the other side, and power transmission means adapted to interconnect said power means and said rotors and providing for rotation of said relatively large rotor in one direction and for rotation of said pair of smaller rotors in the opposite direction.

2. A construction in accordance with claim 1 in which the power transmission means further incorporates an overrunning clutch in the drive to each rotor providing freedom for independent overrunning of the several rotors.

3. A construction in accordance with claim 1 in which the axes of the three rotors are substantially symmetrically arranged with respect to a transverse generally upright plane containing the center of gravity of the aircraft.

4. A construction in accordance with claim 1 in which the axes of the three rotors are substantially symmetrically arranged with respect to a transverse generally upright plane containing the center of gravity of the aircraft and in which, when viewed in plane, the rotor disc of the relatively large rotor overlies at least a large part of the discs of the relatively small rotors.

5. An aircraft of the flappingly-pivoted sustaining rotor type including three rotors each incorporating flappingly-pivoted blades or wings, one of said rotors being of relatively large diameter and disposed with its axis lying generally in the longitudinal plane of symmetry of the craft, and the other two rotors being of relatively small diameter and constituting a pair arranged generally symmetrically with respect to the longitudinal plane of symmetry, one offset to one side of said plane and the other offset to the other side, the three rotors being arranged so that when viewed in plan the rotor disc of the relatively large rotor overlaps the discs of the relatively small rotors to an extent equal to only a fraction of the smaller rotor discs, whereby to reduce vertical clearances between the rotors required to accommodate flapping movements of the rotor blades.

6. A construction in accordance with claim 5 in whch the axes of the three rotors all lie adjacent a transverse vertical plane containing the center of gravity of the aircraft.

7. An aircraft in accordance with claim 5 in which the blades of the several rotors constitute airfoils oriented to provide for rotation of the relatively large rotor in one direction and for rotation of the relatively small rotors in the opposite direction.

8. In an aircraft having power means, three sustaining rotors having substantially elongated airfoil blades, one of said rotors being of relatively large radius and the others of relatively small radius, said rotors being constructed to such relative sizes and blade formations that the two smaller rotors normally rotate efficiently at higher rotational frequencies than the larger rotor, and transmission means between the power means and the rotors adapted to drive the smaller rotors at higher frequencies than the larger rotor.

9. A construction according to claim 8, having free-wheel means whereby the rotors may overrun the power means, with the small rotors turning at higher R. P. M. than the large rotor.

10. A construction according to claim 8, wherein the radius of each of the small rotors is approximately three-quarters the radius of the large rotor.

11. A construction according to claim 8, wherein the radius of each of the small rotors is approximately three-quarters the radius of the large rotor, and the transmission ratios to the large and small rotors are such that each small rotor makes approximately three revolutions to each two revolutions of the large rotor, when power driven.

12. A construction according to claim 8 in which the relation between the blade chord dimension in the small rotors and the large rotors is similar to the relation between the radii of the small and large rotors.

13. In an aircraft having power means, three sustaining rotors having substantially elongated airfoil blades, one of said rotors being of relatively large radius and the others of relatively small radius, transmission means for driving said rotors from said power means and adapted to rotate the large rotor in one direction and the smaller rotors in the opposite direction, and means mounting the rotors in such relation that portions of the rotor disc areas are coincident as viewed in plan.

14. A construction according to claim 13, wherein the mount for the large rotor positions it at a higher plane than the small rotors, and the transmission means are adapted to drive the small rotors at higher R. P. M. than the large rotor.

15. A construction according to claim 13 wherein the mount for the larger rotor centers it approximately above the center of gravity of the craft, and an aircraft control systems is provided which operates by shifting the thrust line of the larger and most effective of the three rotors.

HARRIS S. CAMPBELL.